United States Patent [19]

Zarrabi et al.

[11] Patent Number: 5,388,114
[45] Date of Patent: Feb. 7, 1995

[54] MINIATURIZED SELF-Q-SWITCHED FREQUENCY-DOUBLED LASER

[75] Inventors: Joseph H. Zarrabi, Malden; Shobha Singh, Weston; Pavle Gavrilovic, Brockton, all of Mass.

[73] Assignee: Polaroid Corporation, Cambridge, Mass.

[21] Appl. No.: 210,037

[22] Filed: Mar. 17, 1994

[51] Int. Cl.⁶ .................. H01S 3/16; H01S 3/11; G02F 1/37
[52] U.S. Cl. ...................... 372/22; 372/11; 372/68; 372/40; 359/328; 359/332
[58] Field of Search ............ 372/22, 11, 41, 18, 372/68, 40; 359/326, 328, 332

[56] References Cited

U.S. PATENT DOCUMENTS

| | | | |
|---|---|---|---|
| 3,931,591 | 1/1976 | Greenberg | 372/11 |
| 3,975,694 | 8/1976 | Melamed et al. | 372/11 |
| 4,723,248 | 2/1988 | Harter et al. | 372/11 |
| 4,951,294 | 8/1990 | Basu et al. | 372/75 |
| 4,987,575 | 1/1991 | Alfano et al. | 372/41 |
| 5,058,118 | 10/1991 | Qui et al. | 372/21 |
| 5,070,505 | 12/1991 | Dixon | 372/22 |
| 5,119,382 | 6/1992 | Kennedy et al. | 372/11 |
| 5,159,602 | 10/1992 | Giordano et al. | 371/22.1 |
| 5,164,947 | 11/1992 | Lukas et al. | 372/22 |
| 5,249,193 | 9/1993 | Watanabe | 372/23 |
| 5,274,650 | 12/1993 | Amano | 372/68 |

OTHER PUBLICATIONS

"Self-Q-switched diode-end-pumped Cr,Nd:YAG laser with polarized output," Shiqun Li et al., *Optics Letters*, vol. 18, No. 3, Feb 1993, pp. 203–204.

"Compact GSGG:$Cr^{3+}$:$Nd^{3+}$ laser with passive Q switching," A. A. Danilov et al., *Sov. J. Quantun ELectronics*, 17(5), May 1987, pp. 573–574.

Gui et al., *Digest of Conference on Lasers and Electro-Optics*, p. 166 (1984). (No month available).

Primary Examiner—Rodney B. Bovernick
Assistant Examiner—Robert McNutt
Attorney, Agent, or Firm—Joseph Stecewycz

[57] ABSTRACT

A diode-pumped monolithic laser is fabricated from a self-doubling host material co-doped with two ionic species, where one ionic dopant converts pump radiation to continuous radiation at a fundamental frequency and the other dopant acts as a saturable absorber to Q-switch the fundamental radiation which is then frequency doubled to produce pulsed high-intensity green light, the green light being either outputted or further frequency-doubled, into pulsed coherent UV radiation, by means of a non-linear crystal.

26 Claims, 5 Drawing Sheets

MINIATURIZED SELF-Q-SWITCHED FREQUENCY-DOUBLED LASER

FIELD OF THE INVENTION

This invention relates to lasers and more particularly to a diode-pumped, miniaturized, self-Q-switched, frequency-doubled green laser and its application to a miniaturized UV laser.

BACKGROUND OF THE INVENTION

Diode-pumped miniaturized lasers operating in the green region of the optical spectrum are desirable for many applications such as printing, optical data storage, underwater communication, and medical instrumentation. The term miniaturized laser is generally understood in the art to mean a monolithic solid-state laser having mirrors directly deposited on opposite facets of a gain medium. Of particular interest is a diode-pumped, miniaturized, frequency-doubled green laser. The output radiation of a green laser is essentially free of large-amplitude fluctuations, an operating characteristic which makes the green laser especially attractive for use in optical data storage. Additionally, a miniaturized UV laser can be fabricated by the emplacement of a frequency-doubling, non-linear crystal at the output of a miniaturized green laser to obtain the second harmonic of green light, which corresponds to radiation of UV wavelength.

However, such applications remain largely unrealized because of the practical difficulties encountered in fabricating a miniaturized green laser. These difficulties can be explained by describing some of the conventional laser configurations used for the generation of green laser light.

Intra-Cavity Frequency-Doubled Green Laser

One conventional approach to construction of a UV laser 10 is illustrated in FIG. 1. A green laser 100 emits coherent green light 150 which is directed into a non-linear crystal 20 which acts as a frequency doubling medium to produce coherent UV radiation 170. However, unless the power density of green light 150 is sufficiently large, conversion efficiency, defined as the ratio of UV output to that of green light input, remains unacceptably small. For example, at relatively low power densities of green light (e.g., one to five MW/cm$^2$) the conversion efficiency is only a few per cent. This conversion efficiency improves to about 50% only for green light 150 power densities of 100 MW/cm$^2$ or more.

The power density available at non-linear crystal 20 can be increased if green light 150 output is Q-switched instead of being emitted as a continuous waveform. One method of generating Q-switched green pulses 118' is to place a Q-switched element 124 into a cavity 112. Q-switched element 124 has acousto-optic or electro-optic properties which are controlled by means of an external switching device 130. Thus, if green light 150 output is to be pulsed by means of active Q-switching, green laser 100 requires external switching device 130 to drive Q-switched element 124 and produce a pulsed output.

Power for the operation of green light laser 100 (and, thus, for UV laser 10) is provided by a source of continuous coherent radiation, such as a laser diode source 102. Laser diode source 102 operates in the infrared (IR) spectrum, at a wavelength of approximately 807 nm, to produce a continuous coherent pump radiation 104 which passes through a collimating lens 108 and a focusing lens 110 into cavity 112. Cavity 112 is the region lying between input mirror 114 and output mirror 116. Pump radiation 104 is converted to a continuous coherent fundamental radiation 118 by interaction with a gain medium such as lasing crystal 120. Then, by means of Q-switched element 124 the fundamental radiation 118 is converted to pulsed fundamental radiation 118' which is subsequently frequency doubled to pulsed green light 150 by means of a second harmonic generator (SHG) 132 also emplaced within cavity 112.

A Ti:Sapphire laser, emitting at a wavelength of 807 nm, is commonly used instead of laser diode source 102. Lasing crystal 120 may be neodymium-doped (Nd-doped) yttrium aluminum garnet (YAG) or Nd-doped yttrium vanadate (YVO$_4$). In such a configuration, lasing crystal 120 absorbs the 807 nm pump radiation and emits fundamental radiation 118 at an IR frequency of wavelength of 1.064 $\mu$m because of the presence of the neodymium ions. The continuous, coherent fundamental radiation 118 is converted to pulsed continuous, coherent radiation 118' of wavelength 1.064 $\mu$m by means of Q-switched element 124. Both input facet 126 and output facet 128 of Q-switched element 124 are anti-reflective coated at the fundamental radiation 118 wavelength of 1.064 $\mu$m and at the green light 150 wavelength of 532 nm. SHG 132 converts the incoming pulsed fundamental radiation 118' into pulsed green light 150 of wavelength 532 nm, which is the wavelength corresponding to the second harmonic of the fundamental frequency radiation 118. Commonly-used materials for SHG 132 are non-linear crystals such as potassium titanyl phosphate (KTP) and barium sodium niobate (Ba$_2$NaNb$_5$O$_{12}$).

Although useful for certain applications, the intra-cavity frequency-doubled green laser, as embodied in green laser 100, cannot be used in an application which requires a miniaturized laser. The relevant art has not produced an external switching device which is adequately reduced in physical size. Consequently, it has not been shown possible to fabricate a miniaturized version of an active Q-switched laser.

Frequency-Doubled Single-Pass Green Laser

In the present state of the art, there is an alternative configuration to the pulsed green laser. FIG. 2 shows a single-pass green laser 200 in which a frequency-doubling SHG 232 is placed outside a cavity 212, in contrast to the intra-cavity frequency-doubled green laser 100 described above. The method of operation for single-pass green laser 200 is similar to that described for the intra-cavity configuration. In laser 200, an Nd-doped lasing crystal 220 is pumped by a laser diode source 202 operating in the IR spectrum by which continuous, coherent fundamental radiation 218 is generated. Pulsed IR radiation 218' at the fundamental wavelength is produced by means of a Q-switched element 224. Q-switched element 224 lies on the optical axis within cavity 212, and is controlled by means of an external switching device 230. Pulsed IR radiation 218' is converted into pulsed green light 250 by means of SHG 232.

The configuration of single-pass green laser 200 is also not suitable for the applications noted above because the physical size of external switching device 230 remains an obstacle to miniaturization.

Self-Frequency-Doubled Green Laser

Shown in FIG. 3 is a diode-pumped self-frequency-doubled green laser 300 in which the functions of pump radiation conversion and second harmonic generation are performed by a self-frequency-doubling crystal 320. Because of the self-doubling property of crystal 320, green laser 300 does not require a separate SHG component and can therefore be made smaller is size. Operation of green laser 300 is similar to the previous green laser configurations. Green laser 300 is pumped by a laser diode source 302 operating in the IR range, at a wavelength of approximately 807 nm. Continuous coherent pump radiation 304 is converted into a continuous, coherent green light by means of a single component, self-frequency-doubling crystal 320. The coherent green light is converted into pulsed green light 250 by means of a Q-switched element 324. Self-frequency-doubling crystal 320 performs both the function of converting pump radiation 304 to fundamental radiation 318, and the function of generating continuous coherent green light 350 at the second harmonic of the fundamental radiation 318. Self-frequency-doubling crystal 320 is commonly $Nd_xY_{1-x}Al_3(BO_3)_4$(NYAB). NYAB has a broad absorption band at 807 nm (FWHM=13 nm) with large non-linear coefficient and a high damage threshold. Conversion from 807 nm to a fundamental wavelength 318 of 1.064 $\mu$m is accomplished by means of the neodymium ions in self-frequency-doubling crystal 320. The average power of an NYAB green laser, when pumped by a 1-watt laser diode source at 807 nm, is usually about 10 to 20 mW.

Green laser 300 is an acousto-optically Q-switched NYAB laser where the Q-switched element 324, emplaced in cavity 312, is controlled by an external switching device 330. Clearly, this configuration suffers from the same shortcomings as green laser 100 and green laser 200 above. Because it incorporates external switching device 330, is also not a suitable candidate for miniaturization. Additionally, optical and mechanical alignment of all the components is critical in green laser 300. Any motion of components resulting from external mechanical or thermal stimuli, such as vibration of input mirror 314 with respect to self-frequency-doubling crystal 320, can result in large-amplitude fluctuations in the output of green light 350, and these fluctuations will tend to make the laser system unstable.

In summary, the three conventional green laser systems described above are configurations not suitable for miniaturization because each system incorporates active Q-switching.

Passive Q-Switching

As can be appreciated by those skilled in the art, an active Q-switching laser configuration requires an external switching device which adds to the cost and complexity of a laser system. Further, because such a switching device cannot be readily miniaturized, it becomes difficult to fabricate a miniature laser which employs active Q-switching. Where miniaturization is desired, a possible solution would be to eliminate the requirement for the switching device by incorporating some means of passively Q-switching the continuous coherent radiation.

Gui et al. have reported, in the *Digest of Conference on Lasers and Electro-Optics*, p. 166 (1984), a specially-doped YAG laser crystal made to function as a passive Q-switch and a mode-locking device. An absorption band at 1.064 $\mu$m in Nd-doped lasing crystals, such as YAG and gadolinium scandium gallium garnet (GSGG), had a saturable absorption effect when the lasing crystals had been co-doped with tetravalent chromium ions. This absorption wavelength corresponds to the lasing transition of the neodymium ions present in these lasing crystals. The process responsible for this absorption is believed to be associated with the $Cr^{4+}$ dopant present in the crystals being irradiated.

Passive Q-switching has also been reported in flash-lamp-pumped Nd-doped YAG and GSGG lasers co-doped with $Cr^{4+}$ ions by Danilov et al. in Sov. *J. Quantum Electronics*, Vol. 17(5), p. 573–574 (1987).

Li et al. have reported the passive Q-switching of a solid-state laser in *Optics Letters*, vol. 18, No. 3, pp. 203–04 (1993). Self-Q-switching operation of a diode-end-pumped, Nd: YAG laser co-doped with $Cr^{4+}$ ions, in which the chromium ions act as a saturable absorber for the $Nd^{3+}$ laser emission was described. Emission wavelength was at 1.064 $\mu$m.

None of the aforementioned laser configurations is suitable for application to a diode-pumped, miniaturized green laser. Consequently, there appears to be no self-doubling, self-Q-switching green laser otherwise known in the art at the present time. What is needed is a green laser configuration which can be miniaturized for use in the applications noted above, and which also operates at a power density sufficiently large to efficiently generate UV radiation through the process of frequency doubling.

It is an object of the present invention to provide a solid state laser system which incorporates Q-switching to produce a pulsed coherent output having a high peak power level.

It is a further object of the invention to provide a miniaturized, passively-Q-switched laser system having no external switching device necessary to the operation of the laser.

It is a further object of the invention to provide a miniaturized, self-Q-switched laser providing a pulsed, high-intensity, green-light output.

It is a further object of the invention to provide a miniaturized UV laser powered by a self-Q-switched green laser.

SUMMARY OF THE INVENTION

The present invention is a miniaturized, self-Q-switched, frequency-doubled green laser based on the observation that tetravalent chromium ions can be utilized to impart a passive Q-switching property to a host material. In a particular embodiment, the host material is a self-frequency-doubling NYAB crystal, co-doped with $Cr^{4+}$ ions. Doping with neodymium (Nd) provides the means by which suitable incident infrared radiation is converted into radiation of wavelength 1.064 $\mu$m, which is the fundamental emission wavelength of the NYAB crystal. The co-doping of the NYAB crystal with $Cr^{4+}$ produces a saturable absorber at the 1.064 $\mu$m wavelength to provide the host material with a self-Q-switched property. Both ends of the co-doped NYAB crystal are mirrored to form a resonator for the fundamental radiation. By means of the self-Q-switched, self-frequency-doubling resonator comprised of a co-doped NYAB crystal, incident IR radiation is converted into coherent green light pulses with high peak power. The green light output can, subsequently, be frequency-doubled to a UV wavelength. The conversion efficiency in this process can be as high as 70 to 80%, because of the high intensity of the Q-switched green-light pulses.

BRIEF DESCRIPTION OF THE DRAWINGS

The novel features that are considered characteristic of the present invention are set forth with particularity herein. The organization and method of operation of the invention, together with other object and advantages thereof, will be best understood from the following description of the illustrated embodiments when read in conjunction with the accompanying drawings wherein.

DETAILED DESCRIPTION OF THE INVENTION

Monolithic Flat-Flat Laser

Figure 1:
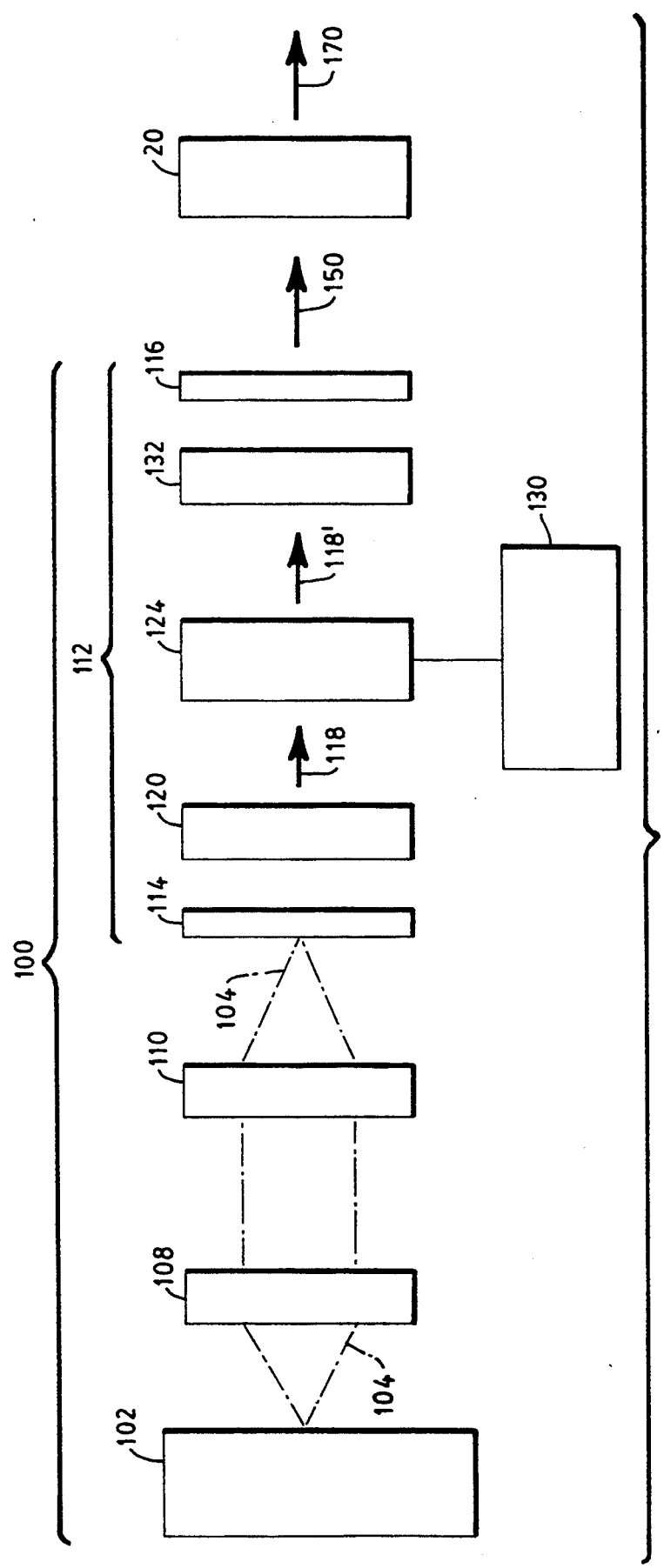
FIG. 1 is a diagram of a prior-art UV laser incorporating a Nd: YAG gain medium and powered by an active Q-switched intra-cavity frequency-doubled green laser.
Figure 2:
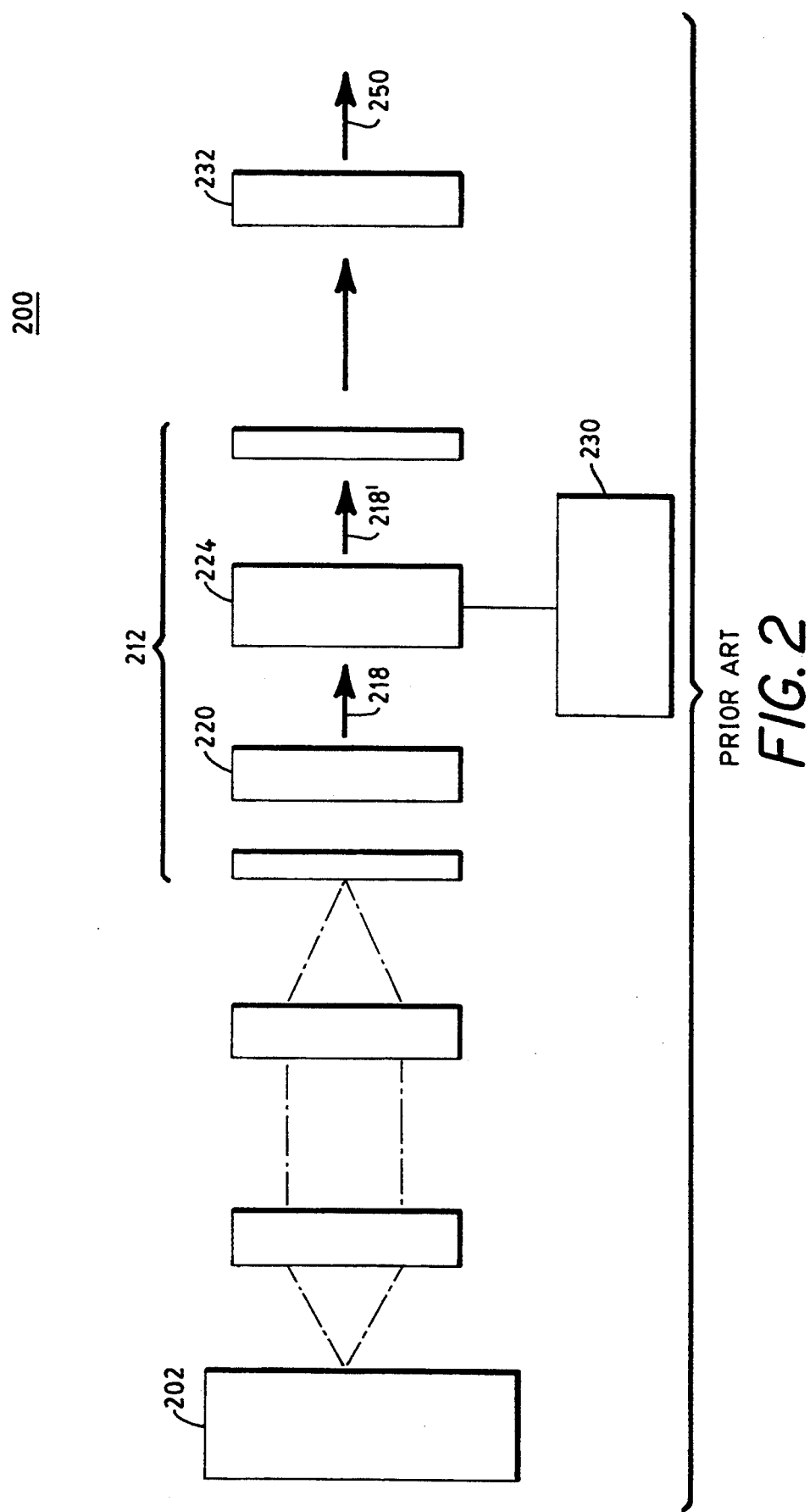
FIG. 2 is a diagram of a prior-art frequency-doubled single-pass green laser, similar to the configuration of the laser in FIG. 1, but in which the second harmonic generating element is emplaced outside the resonance cavity.
Figure 3:
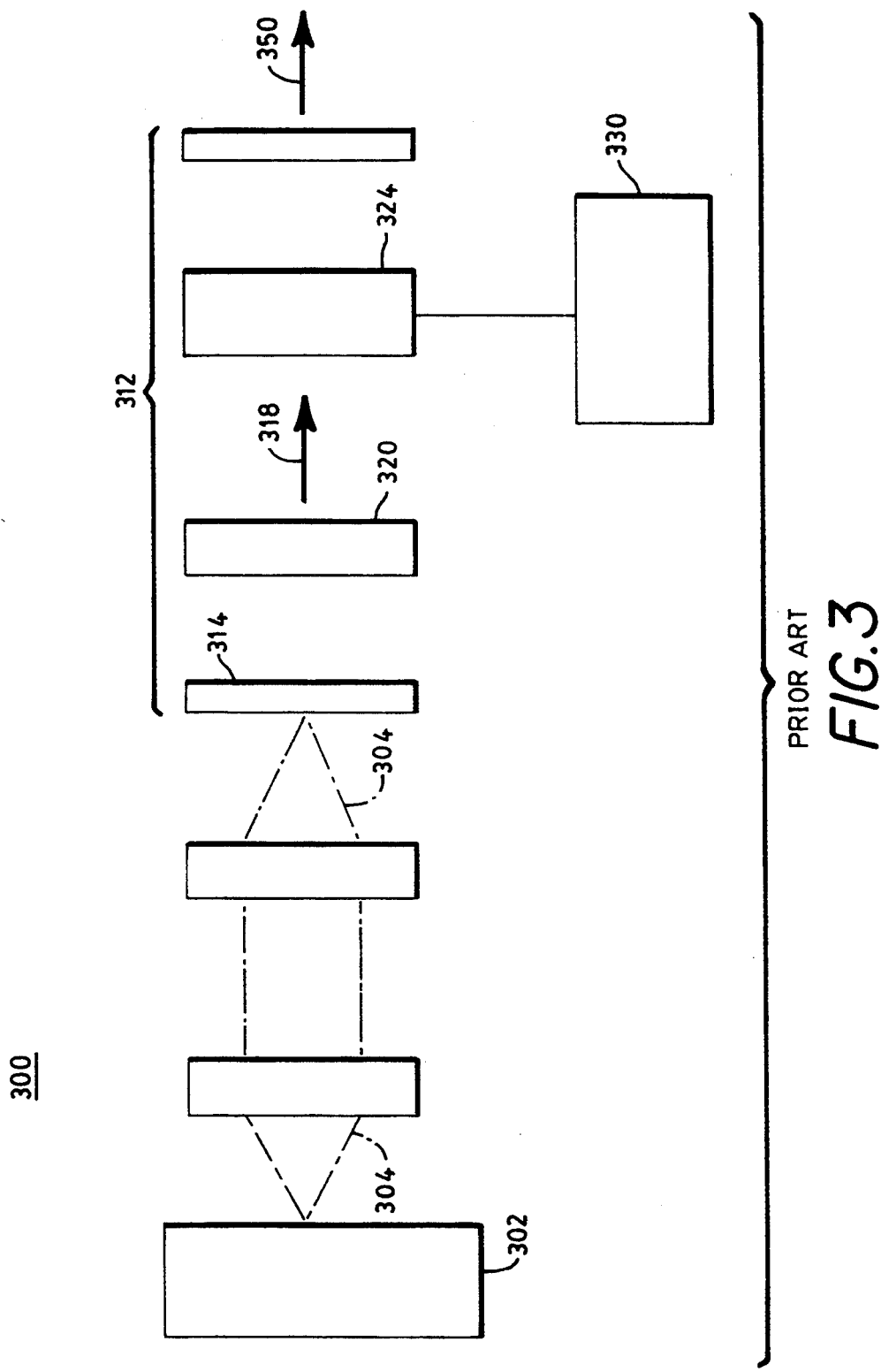
FIG. 3 is a diagram of a prior-art active Q-switched, self-frequency-doubled green laser incorporating NYAB as the gain medium.
Figure 4:
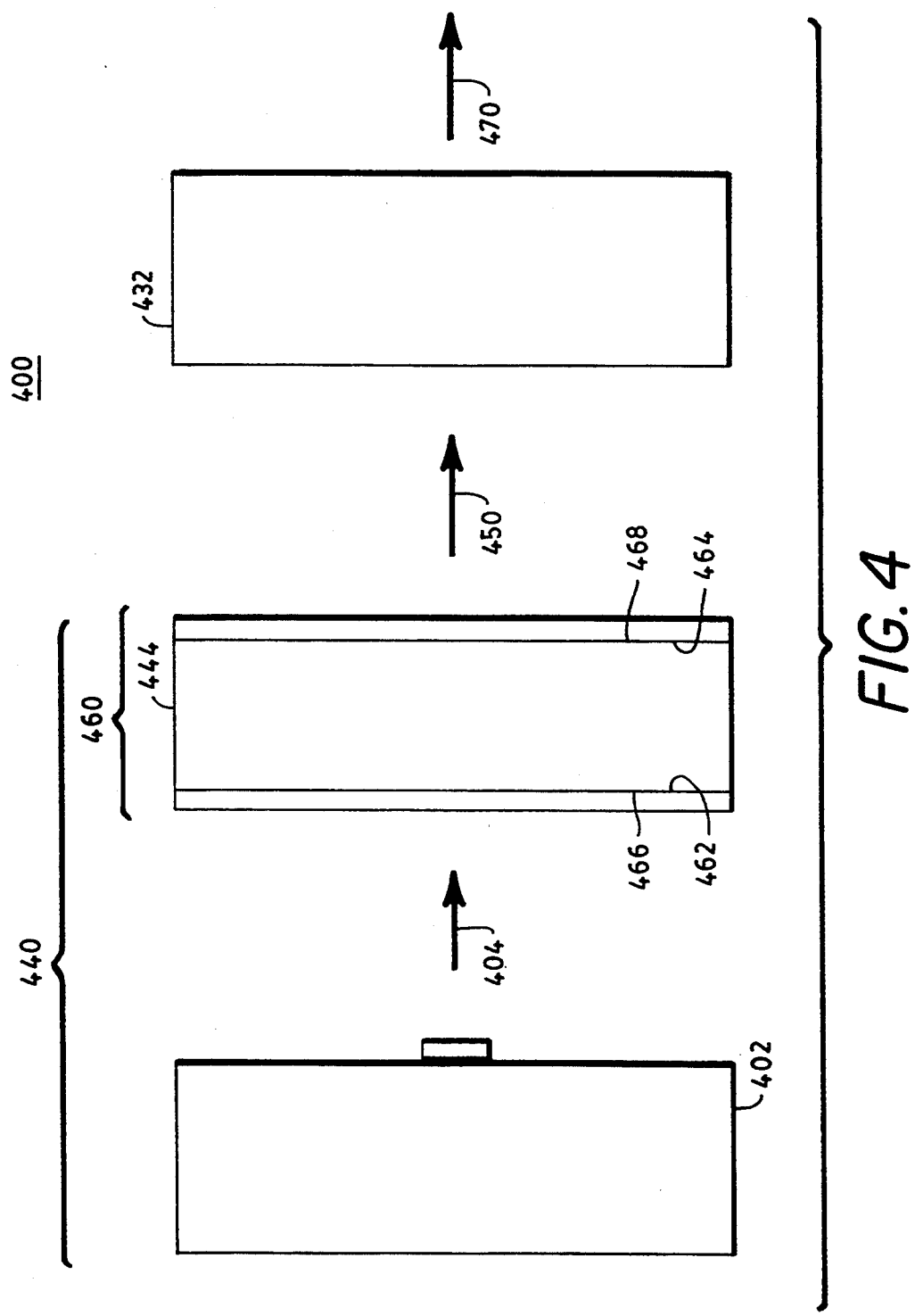
FIG. 4 is a diagram of a monolithic flat-flat self-Q-switched, self frequency-doubled UV laser incorporating an NYAB crystal co-doped with tetravalent chromium ions, the laser being a first embodiment in accordance with the present invention.

FIG. 4 shows a preferred embodiment of the present invention. UV laser 400 is comprised of a non-linear crystal 432 and a monolithic, flat-flat, self-Q-switched, self-frequency-doubled green laser 440 producing green light 450 in a TEM$_{00}$ mode. Non-linear crystal 432 is comprised of a material suitable for generation of coherent UV radiation at 266 nm, such as beta barium borate (BaB$_2$O$_4$ or BBO) or lithium triborate (LiB$_3$O$_5$ or LBO).

Green laser 440 is powered by a source 402 producing continuous, coherent pump radiation 404, preferably emitting at wavelength 807 nm. Source 402 can be a high power laser diode or any other appropriate source operating at 807 to 809 nm, such as a Ti:Sapphire laser. Such laser diodes are well known to those skilled in the art and may be obtained from vendors such as Spectra-Diode Laboratories, Laser Diode, Inc., and Siemens, among others. Continuous, coherent pump radiation 404 is directed into a self-frequency-doubling host material 444 which is also self-Q-switched.

Self-Q-switched self-frequency-doubling host material 444 is obtained by co-doping a suitable non-linear material with dopants comprising two different ion species. The non-linear material can be barium sodium niobate, lithium niobate (LiNbO$_3$), or yttrium aluminum borate (YAl$_3$(BO$_3$)$_4$). The first ionic dopant is preferably trivalent neodymium (Nd$^{3+}$). By means of the first ionic dopant, self-frequency-doubling host material 444 convert continuous coherent pump radiation 404 at 807 nm into a continuous coherent radiation at the fundamental wavelength of 1.064 μm.

The second ionic dopant acts as a saturable absorber for the radiation of wavelength 1.064 μm present in self-frequency-doubling host material 444. By means of the saturable absorber, self-Q-switching occurs and the continuous coherent radiation at the fundamental wavelength of 1.064 μm is converted into pulsed coherent radiation of wavelength 1.064 μm. The self-Q-switching property of self-frequency-doubling host material 444 is provided by means of this second ionic dopant, the dopant preferably being tetravalent chromium ions (Cr$^{4+}$), although other suitable ions which act as a saturable absorber for the radiation of wavelength 1.064 μm, such as iron (Fe$^{2+}$), cobalt (Co$^{3+}$), or nickel (Ni$^{3+}$), can be used as well.

The pulsed coherent radiation of wavelength 1.064 μm, generated as described above, is then converted to pulsed coherent radiation of wavelength of 532 nm by means of the frequency-doubling property of self-frequency-doubling host material 444.

Input mirror 462 and output mirror 464, which operate to provide feedback, are formed by direct deposition of reflective layers, such as dielectric, onto input facet 466 and output facet 468 of self-frequency-doubling host material 444. Input mirror 462 is highly transmissible at the pump radiation 404 wavelength of 807 nm but is highly reflective at both the fundamental wavelength of 1.064 μm and its second harmonic of wavelength 532 nm. Output mirror 464 is highly reflective at both the pump wavelength of 807 nm and at the fundamental wavelength of 1.064 μm but is highly transmissive at the second harmonic of 532 nm. Thus, input mirror 462 and output mirror 464 are highly reflective at the fundamental wavelength and form a resonator 460.

In the preferred embodiment, resonator 460 comprises an etalon of neodymium-doped yttrium aluminum borate (NYAB) having a thickness of approximately 0.5 min. The self Q-switching property is provided by doping with Cr$^{4+}$ ions. The preferred level of co-doping results in a transmission factor of between 10 and 50% for the NYAB material.

The advantages of the mirror coatings as specified are twofold. First, pump radiation 404 is passed through self-frequency-doubling host material 444 twice. Increasing the number of passes from one to two raises the proportion of coherent pump radiation 404 which is absorbed by self-frequency-doubling host material 444 and is converted to green light 450. Second, green light 450 will be unidirectional. In the preferred single-longitudinal-mode operation, the Fabry-Perot mode spacing at the fundamental wavelength of 1.064 μm exceeds the gain bandwidth. Since only one mode falls within the gain bandwidth, operation on a single longitudinal mode is possible.

During operation of UV laser 400, resonator 460 is powered by laser diode source 402 emitting at 807 nm. Green light 450, produced by means of self-frequency-doubling host material 444, will be in the form of pulses. The peak power level of pulsed green light 450 will be higher than the power level of a corresponding continuous wave radiation output. Directing the high intensity green light pulses into non-linear crystal 432 produces coherent UV radiation 470 at 266 nm.

For miniaturization and compactness, non-linear crystal 432 is attached directly, or "butt-coupled" to resonator 460. By butt-coupling is meant that pulsed green light 450 will optically pump a mode volume within non-linear crystal 432 with a sufficiently small transverse cross-sectional area as to support essentially only a single transverse mode (TEM$_{00}$) operation.

Moreover, one can tune the green light 450 output of green laser 440 because green laser 440 is a miniaturized, compact, microchip device. It is possible to apply thermal or mechanical stress to the self-frequency doubling host material 444. In this way, green light 450 can be tuned either by an application of pressure to or by a change in the ambient temperature of laser 440.

Monolithic Flat-Convex Laser

For higher-power laser systems, a monolithic flat-convex configuration is preferable to the monolithic flat-flat laser described above. As the power of the coherent pump radiation 404 is increased in the monolithic flat-flat laser, its output 450 may become spatially multimode. One approach to stabilizing output 450 is to change the output facet 468 of self-frequency-doubling host material 444 from a flat surface to a convex surface and thus maintain a $TEM_{00}$ mode. Upon adding a curvature to the output facet of a resonator, multimode behavior is effectively eliminated from the green light output.

Figure 5:
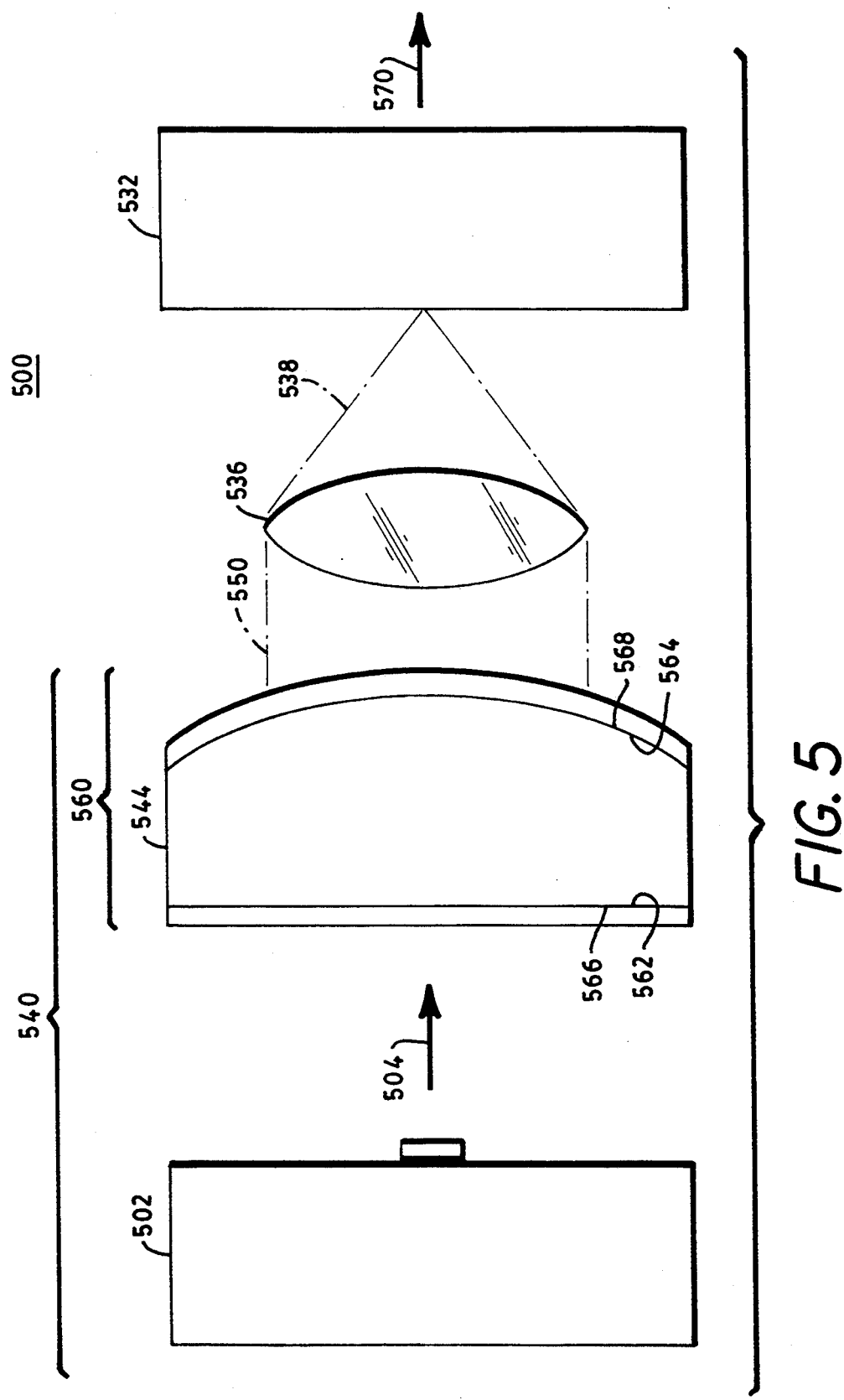
FIG. 5 is a diagram of a monolithic flat-convex self-Q-switched, self frequency-doubled UV laser in a second embodiment in accordance with the present invention.

FIG. 5 shows an alternative embodiment of the monolithic UV laser of FIG. 4. UV laser 500 is a flat-convex self-Q-switched laser comprised of a non-linear crystal 532 and a monolithic, flat-convex, self-Q-switched frequency-doubled green laser 540 producing green light 550. Output facet 568 of resonator 560 is convex. Non-linear crystal 532 is comprised of a material suitable for conversion of green light into coherent UV radiation at 266 nm, such as BBO or LBO.

Green laser 540 is powered by laser diode source 502 producing pump radiation 504 emitting at wavelength 807 nm. Laser diode source 502 can be any appropriate laser source operating at 807 to 809 nm. Pump radiation 504 is directed into a self-frequency-doubling host material 544 which is also a self-Q-switched material. By means of self-frequency-doubled host material 544, pump radiation 504 is converted into radiation at both the fundamental wavelength of 1.064 μm and its second harmonic at 532 nm. In a preferred single longitudinal-mode operation, the thickness of self-frequency-doubling host material 544 is be chosen such that the Fabry-Perot mode spacing at the fundamental wavelength will exceed the gain bandwidth.

Input mirror 562 and output mirror 564 are formed by direct deposition onto input facet 566 and output facet 568, respectively, of self-frequency-doubling host material 544. Host material 544 is co-doped with $Cr^{4+}$ ions, or other suitable ions, which will produce a self-Q-switching property in host material 544. Input mirror 562 is highly transmissible at the pump wavelength of 807 nm but is highly reflective at both the fundamental wavelength of 1.064 μm and the second harmonic of wavelength 532 nm. Output mirror 564, which is convex, is highly reflective at both the pump wavelength of 807 nm and at the fundamental wavelength of 1.064 μm but is highly transmissible at the second harmonic of 532 nm. Pulsed high-intensity coherent green light 550 is focused by lens 536 onto nonlinear crystal 532. The curvature of output mirror 564 is selected to provide a good overlap between focused pump radiation 504 and the fundamental mode $TEM_{00}$ of green light 550 within resonator 560.

The present invention is advantageously adapted to provide higher peak power levels in a miniaturized green laser system, and to provide greater a conversion efficiency in a UV laser system than is presently available in conventional green and UV laser systems. While there have been described preferred embodiments of the present invention, it will be readily apparent to those skilled in the art that various changes and modifications may be made therein without departing from the invention, and it is intended in the wording of the appended claims to include such changes and modifications as would be encompassed by the true spirit and scope of the invention.

What is claimed is:

1. A laser, comprising:
   a laser cavity comprising a self-frequency-doubling host material doped with at least two ionic species, where one of said ionic species absorbs energy at one wavelength $\lambda_1$, and emits it at another wavelength $\lambda_2$, larger than $\lambda_1$, said other ionic species having the property that it is a saturable absorber with respect to said first ionic species so that said other ionic species absorbs energy emitted from said first ionic species at wavelength $\lambda_2$ and emits energy within said cavity in the form of a series of high-intensity radiation pulses at wavelength $\lambda_2$;
   a radiation source optically coupled with said laser cavity to pump said first ionic species so that it emits radiation at wavelength $\lambda_2$, which is then converted to said high-intensity radiation pulses at wavelength $\lambda_2$ via said other ionic species; and
   means for providing feedback to said laser cavity so that it operates as a resonator at wavelength $\lambda_2$ to propagate said high-intensity pulses at wavelength $\lambda_2$ along its length so that said self-frequency-doubling host material operates to convert said high-intensity pulses at $\lambda_2$ into a series of high-intensity pulses at $\lambda_3$, and for transmitting said series of high-intensity pulses at wavelength $\lambda_3$, that is half the wavelength of $\lambda_2$, from said laser cavity so that they are available for use outside of said laser.

2. The laser of claim 1 further comprising a non-linear crystal positioned to receive said series of high-intensity pulses emitted from said laser at $\lambda_3$ and to convert them into a series of pulses at wavelength $\lambda_4$, that is half the wavelength of $\lambda_3$.

3. The laser of claim 2 wherein said means for providing feedback comprises input mirror means and output mirror means, said input mirror means being flat and highly transmissible at wavelength $\lambda_1$, and also being highly reflective at wavelength $\lambda_2$ and at wavelength $\lambda_3$; said output mirror means being convex and highly reflective at wavelength $\lambda_1$ and at wavelength $\lambda_2$, also being highly transmissible at wavelength $\lambda_3$; and wherein said laser further comprises lens means disposed between said output mirror means and said non-linear crystal whereby said series of high-intensity pulses at $\lambda_3$ are brought to focus upon said non-linear crystal.

4. The laser of claim 2 wherein said non-linear crystal comprises a material which is selected from the group consisting of: beta barium borate ($BaB_2O_4$) and lithium triborate ($LiB_3O_5$).

5. The laser of claim 1 wherein said means for providing feedback comprises input mirror means and output mirror means, said input mirror means being highly transmissible at wavelength $\lambda_1$, and also being highly reflective at wavelength $\lambda_2$ and at wavelength $\lambda_3$, and said output mirror means being highly reflective at wavelength $\lambda_1$ and at wavelength $\lambda_2$, also being highly transmissible at wavelength $\lambda_3$.

6. The laser of claim 5 wherein said mirror means are flat and substantially parallel to one another.

7. The laser of claim 5 wherein $\lambda_1 = 807$ nm, $\lambda_2 = 1.064$ μm, and $\lambda_3 = 532$ nm.

8. The laser of claim 1 wherein said radiation source comprises a laser diode.

9. The laser of claim 8 in which $\lambda_1$ is 807 to 809 nm.

10. The laser of claim 1 wherein said self-frequency-doubling host material comprises a material which is selected from the group consisting of: barium sodium niobate ($Ba_2NaNb_5O_{12}$), lithium niobate ($LiNbO_3$), and yttrium aluminum borate ($YAl_3(BO_3)_4$).

11. The laser of claim 10 in which said self-frequency-doubling host material is in the form of an etalon having a thickness of approximately 0.5 mm.

12. The laser of claim 1 wherein said first ionic dopant is neodymium ($Nd^{3+}$).

13. The laser of claim 1 wherein said second ionic dopant comprises a material which is selected from the group consisting of: tetravalent chromium ($Cr^{4+}$), trivalent cobalt ($Co^{3+}$), divalent iron ($Fe^{2+}$), and trivalent nickel ($Ni^{3+}$).

14. The laser of claim 1 wherein each said mirror means comprises a deposition of at least one dielectric layer.

15. A laser, comprising:
a laser cavity comprising a self-frequency-doubling host material doped with trivalent neodymium ions ($Nd^{3+}$) and tetravalent chromium ions ($Cr^{4+}$), where said neodymium ions absorb energy at 807 nm and emits energy at wavelength 1.064 μm, and said tetravalent chromium ions act as saturable absorbers with respect to said neodymium ions so that energy emitted from said neodymium ions are absorbed by said chromium ions and further, that said chromium ions emit energy in the form of high-intensity radiation pulses at wavelength 1.064 μm;
a laser diode, operating at a wavelength of 807 to 809 nm, optically coupled with said laser cavity to pump said neodymium ions so that said neodymium ions emit radiation at wavelength 1.064 μm which is then converted to said high-intensity radiation pulses at wavelength 1.064 μm via said chromium ions; and
means for providing feedback to said laser cavity so that it operates as a resonator at wavelength 1.064 μm to propagate said high-intensity pulses at wavelength 1.064 μm along its length so that said self-frequency-doubling host material operates to convert said high-intensity pulses at 1.064 μm into a series of high-intensity pulses at 532 nm and for transmitting said series of high-intensity pulses at wavelength 532 nm from said laser cavity so that they are available for use outside of said laser.

16. The laser of claim 15 further comprising a non-linear crystal positioned to receive said series of high-intensity pulses emitted from said laser at wavelength 532 nm and to convert them into a series of pulses at wavelength 266 nm.

17. The laser of claim 16 wherein said means for providing feedback comprises input mirror means and output mirror means, said input mirror means being flat and highly transmissible at wavelength 807 to 809 nm, and also being highly reflective at wavelengths 1.064 μm and 532 nm; said output mirror means being convex and highly reflective at wavelength 807 to 809 nm and at wavelength 1.064 μm, also being highly transmissible at wavelength 532 nm; and wherein said laser further comprises lens means disposed between said output mirror means and said non-linear crystal whereby the said series of high-intensity pulses at wavelength 532 nm are brought to focus upon said non-linear crystal.

18. The laser of claim 16 wherein said means for providing feedback comprises input mirror means and output mirror means, said input mirror means being flat and highly transmissible at wavelength 807 to 809 nm, and also being highly reflective at wavelengths 1.064 μm and 532 nm; said output mirror means being convex and highly reflective at wavelength 807 to 809 nm and at wavelength 1.064 μm, also being highly transmissible at wavelength 532 nm; and wherein said laser further comprises lens means disposed between said output mirror means and said non-linear crystal whereby said series of high-intensity pulses at 532 nm are brought to focus upon said non-linear crystal.

19. The laser of claim 16 in which said self-frequency-doubling host material is in the form of an etalon having a thickness of approximately 0.5 min.

20. The laser of claim 15 wherein said means for providing feedback comprises input mirror means and output mirror means, said input mirror means being highly transmissible at wavelength 807 to 809 nm, and also being highly reflective at wavelengths 1.064 μm and 532 nm; said output mirror means being highly reflective at wavelength 807 to 809 nm and at wavelength 1.064 μm, also being highly transmissible at wavelength 532 nm; and said mirror means further being flat and essentially parallel to one another.

21. The laser of claim 15 wherein said self-frequency-doubling host material comprises a material which is selected from the group consisting of: barium sodium niobate ($Ba_2NaNb_5O_{12}$), lithium niobate ($LiNbO_3$), and yttrium aluminum borate ($YAl_3(BO_3)_4$).

22. The laser of claim 15 wherein said mirror means are flat and substantially parallel to one another.

23. A laser, comprising:
a laser cavity comprising a self-frequency-doubling host material doped with neodymium ions ($Nd^{3+}$) and tetravalent chromium ions ($Cr^{4+}$), where said neodymium ions absorb energy at 807 nm and emits energy at wavelength 1.064 μm, and said tetravalent chromium ions acting as saturable absorbers so that energy emitted from said neodymium ions are absorbed by said chromium ions, and further, that said chromium ions emit energy in the form of high-intensity radiation pulses at wavelength 1.064 μm;
a laser diode, operating at a wavelength of 807 to 809 nm, optically coupled with said laser cavity to pump said neodymium ions so that said neodymium ions emit radiation at wavelength 1.064 μm which is then converted to said high-intensity radiation pulses at wavelength 1.064 μm via said chromium ions;
input mirror means and output mirror means, said input mirror means being highly transmissible at wavelength 807 to 809 nm, and also being highly reflective at wavelengths 1.064 μm and 532 nm, said output mirror means being highly reflective at wavelength 807 to 809 nm and at wavelength 1.064 μm, also being highly transmissible at wavelength 532 nm, so that said laser cavity operates as a resonator at wavelength 1.064 μm to propagate said high-intensity pulses at wavelength 1.064 μm along its length so that said self-frequency-doubling host material operates to convert said high-intensity pulses at 1.064 μm into said series of high-intensity pulses at 532 nm and for transmitting said series of high-intensity pulses at wavelength 532 nm from said laser cavity; and a non-linear crystal positioned to receive said series of high-intensity pulses emitted from said laser at wavelength 532 nm and to convert them into a series of pulses at wavelength 266 nm.

24. The laser of claim 23 where said non-linear crystal comprises a crystal of beta barium borate ($BaB_2O_4$).

25. The laser of claim 23 where said non-linear crystal comprises a crystal of lithium triborate ($LiB_3O_5$).

26. The laser of claim 23 further comprising lens means disposed between said output mirror means and said non-linear crystal whereby the said series of high-intensity pulses at wavelength 532 nm are brought to focus upon said non-linear crystal.

* * * * *